F. FRANCIS.
ANCHORS.

No. 177,492.  Patented May 16, 1876.

UNITED STATES PATENT OFFICE.

FRANK FRANCIS, OF VIENNA, AUSTRIA.

IMPROVEMENT IN ANCHORS.

Specification forming part of Letters Patent No. 177,492, dated May 16, 1876; application filed May 2, 1876.

*To all whom it may concern:*

Be it known that I, FRANK FRANCIS, of Vienna, Austria, have invented certain new and useful Improvements in Anchors; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction of an anchor, as will be hereinafter more fully set forth.

Figure 1:
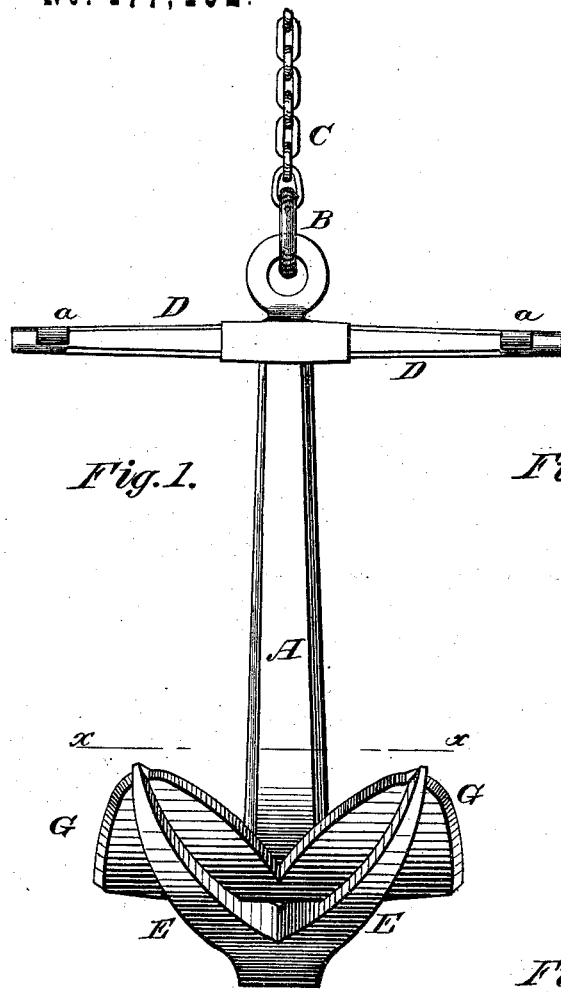
Figure 2:
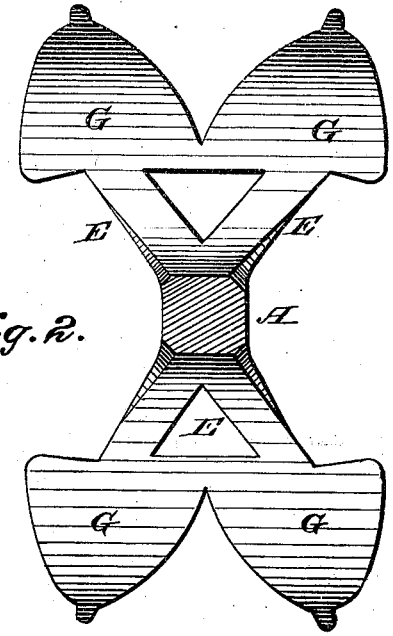
Figure 3:
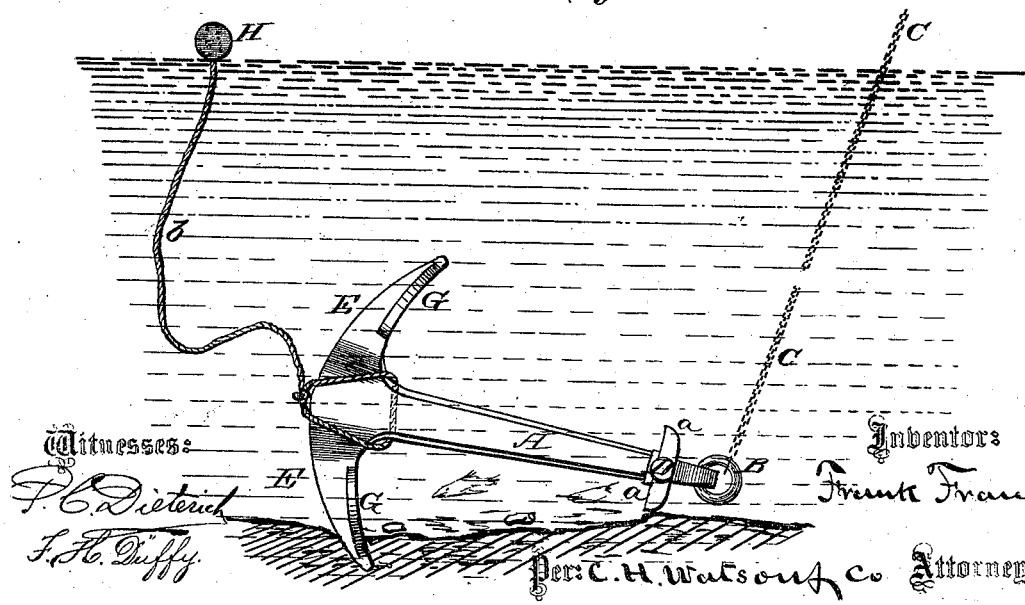

In the annexed drawing, Figure 1 is a front view of my improved anchor. Fig. 2 is a section of the same through the line $x\,x$, Fig. 1. Fig. 3 represents the position of the anchor in the water.

A represents the stem of the anchor, provided at its upper end with the ring B, for the attachment of the chain C. Near the same end of the stem A is the cross-bar D, provided at each end on both sides with a short arm or projection, $a$. The stem A gradually increases in size toward the other end, where on each side are two arms, E E, curved upward, as shown, and on these arms are formed the flukes or blades G G, which have rounded corners to prevent the chain from catching or getting foul of them. The inner corners of the two blades or flukes on each side of the anchor join together, as shown, and on the under side of the fluke the arm G extends the entire length to the outer corner, forming a brace or strengthening-rib for the same. H represents a buoy connected by a line, $b$, with the lower end of the anchor, to facilitate the hoisting of the same if the flukes or blades should get too much hold on the bottom.

Having thus fully described my invention, what I claim as new, and desire to secure by Letters Patent, is—

The within-described anchor, consisting of the stem A, with cross-bar D, the two curved arms E E on each side, and the connected flukes or blades G G on said arms, all constructed substantially as herein shown and described.

In testimony that I claim the foregoing as my own I affix my signature in presence of two witnesses.

FRANK <sup>his</sup> × <sub>mark.</sub> FRANCIS.

Witnesses:
 WM. B. UPPERMAN,
 C. H. WATSON.